US006482322B1

(12) United States Patent
Tsigonis

(10) Patent No.: US 6,482,322 B1
(45) Date of Patent: Nov. 19, 2002

(54) APPARATUS AND METHOD FOR TREATING SEWAGE IN COLD CLIMATES

(76) Inventor: Robert C. Tsigonis, 988 Old Steese Hwy. North, Fairbanks, AK (US) 99712

( * ) Notice: Subject to any disclaimer, the term of this patent is extended or adjusted under 35 U.S.C. 154(b) by 0 days.

(21) Appl. No.: 09/558,489

(22) Filed: Apr. 26, 2000

(51) Int. Cl.[7] .............................. C02F 3/02; C02F 3/20
(52) U.S. Cl. ...................... 210/620; 210/631; 210/205; 210/207; 210/218; 210/221.2; 261/DIG. 70
(58) Field of Search .................... 210/620, 631, 210/150, 612, 177, 180, 198.1, 205, 207, 209, 220, 221.1, 221.2, 218, 416.1; 261/DIG. 70

(56) References Cited

U.S. PATENT DOCUMENTS

| | | | |
|---|---|---|---|
| 3,054,602 A | * | 9/1962 | Proudman |
| 3,598,236 A | * | 8/1971 | Siguna et al. |
| 3,925,208 A | * | 12/1975 | Yost |
| 3,975,276 A | * | 8/1976 | Schmid |
| 4,439,323 A | * | 3/1984 | Ball |
| 4,564,457 A | * | 1/1986 | Cairo, Jr. et al. |
| 5,340,469 A | * | 8/1994 | Montgomery |
| 5,484,524 A | * | 1/1996 | MacLaren et al. |
| 5,587,081 A | * | 12/1996 | Norcross et al. |
| 5,656,173 A | * | 8/1997 | Jordan et al. |
| 5,904,847 A | * | 5/1999 | Bovington |
| 6,010,551 A | * | 1/2000 | Jonninen |

OTHER PUBLICATIONS

Bio–Microbics, Inc., Lenexa, KS, "Fast Wastewater Treatment Systems", 1998 Bi–Microbics, Inc., promotional brochure.

* cited by examiner

Primary Examiner—David A. Simmons
Assistant Examiner—Fred Prince
(74) Attorney, Agent, or Firm—Christie, Parker & Hale, LLP

(57) ABSTRACT

A method and apparatus for treating sewage in cold regions including a pretreatment stage, an aerobic treatment stage, and a discharge stage, where cold outside air is combined with warm recirculating air from within the sewage treatment system to provide oxygen for the aerobic treatment of the sewage, with the treated sewage being discharged intermittently in high volume, high flow-rate batches to prevent freezing.

20 Claims, 1 Drawing Sheet

APPARATUS AND METHOD FOR TREATING SEWAGE IN COLD CLIMATES

BACKGROUND OF THE INVENTION

This invention is related to sewage treatment, and more specifically, to a method of and an apparatus for treating and disposing of sewage in cold regions.

Historically, sewage treatment in cold regions has been plagued by problems. Cold regions include Arctic, subArctic, and Antarctic regions. One problem common in many cold regions is permanently frozen soil, or permafrost. The placement of foreign objects on top of or within permafrost may, over time, cause melting of the permafrost, which in turn can cause sinking, settling or collapse of the soil.

In more temperate regions, underground treatment systems such as septic tanks with soil absorption systems have been used. However, in cold regions such underground systems are not feasible for several reasons. Permafrost may preclude the use of underground systems as it may prevent digging, or the placement of an underground system may thaw the permafrost. Placing the systems above ground would generally provide too cold of an environment for proper sewage treatment, and might still melt the permafrost below. Even the addition of external heat sources to such systems is generally not feasible, as such heat sources would have a greater thawing effect on the permafrost.

Permafrost, and the accompanying frigid conditions above ground that are typical in cold regions, have greatly reduced the viability of traditional sewage systems. One common solution in remote areas has been the "honey bucket" system, where sewage is stored in a tank or other receptacle, and periodically collected from the individual tanks and taken to a centralized sewage treatment facility. This necessitates a vehicle and personnel to collect and haul the sewage, and an enclosed sewage treatment facility, all of which are typically quite expensive. In addition, the individual tanks or receptacles face the possibility of freezing, overflow, or other failure, and thereby pose a health risk to not only the individual user but also the surrounding community.

Another approach has been to use a traditional septic tank, but with an above ground leach field, called a soil absorption mound. However, the heat from the septic tank, or the pipes, or even the absorption mound, may cause melting of the permafrost, and differential movement of the components, such that pipes may become dislodged or break away from the tank or the mound, causing spillage and failure of the system. In addition, where the ground is frozen, the effluent may not flow down into the ground, but instead flow horizontally outside of the mound, with the anaerobically treated effluent giving off a strong odor.

A more advanced approach has been to build more traditional sewage collection systems, which route the sewage to a centralized sewage treatment facility. However, the components of such a system are still subject to the dangers of permafrost. Permafrost may hamper the ability to dig and bury such collection systems, and if such systems are placed above ground, the heat generated may still cause melting of the permafrost, and the accompany differential movement of the collection system may cause leakage and/or failure. In addition, a centralized sewage treatment center must be constructed and operated, generally at great expense, as it must typically be enclosed in a heated building.

Thus there exists the need for a sewage treatment system, and a method for treating sewage, usable in cold regions and/or above or within permanently frozen ground, which will operate efficiently, in a safe and sanitary way, to treat the sewage in a cost-effective manner. cl SUMMARY OF THE INVENTION The present invention is embodied in a method and apparatus for treating sewage utilizing a multi-compartment sewage treatment system which operates in cold regions, above and/or within frozen ground, using a combination of fresh and recirculated air to aerobically treat the sewage to the extent that the effluent may be discharged directly to the environment, all while avoiding cold-related failure, and without the need for an external heat source.

The sewage treatment system provides a pretreatment compartment, having an inlet and an outlet, an aerobic treatment compartment, containing an aerobic sewage treatment unit, and also having an inlet and outlet, such that the inlet of the aerobic treatment compartment is coupled to the outlet of the pretreatment compartment to permit flow of sewage between the two.

An important feature of this invention is that the compartments of the system can be enclosed in a single insulated tank, and thus can be used above permafrost without thawing the frozen soil.

Another feature of the present invention is that the system may include a blower, having a first air inlet and a second air inlet, both coupled to an air outlet, such that the first air inlet draws in air from outside the sewage treatment system, and the second air inlet draws in and recirculates air from inside the sewage treatment system. The air outlet is coupled to the aerobic sewage treatment unit to permit air flow through the aerobic sewage treatment unit.

An advantage of this feature is that the combination of the coupled compartments and the blower act to contain the heat from both the sewage itself and the blower, to heat the entire system, prevent freezing, and provide air to the aerobic treatment unit at the proper temperature.

Another advantage of the system is that it is energy efficient, as powering the blower uses approximately the same amount of energy as powering a large lightbulb, with a very small energy requirement to treat the sewage and keep it thawed.

Another feature of the present invention is that the system may include a discharge compartment, which holds the treated sewage until it is discharged.

Another feature of the present invention is that the system may include a dosing siphon within the discharge compartment to discharge the treated sewage. An advantage including a dosing siphon is that the effluent is released in "slugs" or "batches" and thus does not freeze up or "glacier" within the discharge line or at the point of discharge, but instead flows out through the discharge line in intermittent, high volume, high flow rate discharges.

Another advantage of the discharge compartment is that it may also contain disinfecting equipment, so that the treated sewage may be disinfected before it is discharged.

Another advantage of the present invention is that it is much more environmentally sensitive than typical septic tanks, with the effluent having significantly lower $BOD_5$, (5 day Biochemical Oxygen Demand) and total suspended solids concentrations than the effluent of a typical septic system. In addition, because the sewage has been aerobically treated, the effluent does not have the odor common to the anaerobically treated effluent of a septic system.

Another advantage of this present invention is that although it was originally designed for use above permafrost, it can also be used advantageously in areas of shallow bedrock, layers of clay, or in other situations where subsurface discharge of treated sewage is ineffective, impossible or prohibitively costly.

Another advantage of the present invention is that it is relatively inexpensive, does not require specialized indoor plumbing configurations or fixtures, and is simple and requires little maintenance.

Another advantage of the present invention is that it is adaptable to a variety of temperature conditions, does not need to be enclosed in a building, and is scalable depending on the design sewage load.

Another advantage of the present invention is that it can be used as a temporary, above-ground sewage treatment system to replace failed septic systems, especially in cold regions where the frozen ground may make it virtually impossible to dig out and replace a failed septic system.

Another advantage of the present invention is that by utilizing surface discharge, and by recovering a portion of the latent heat from the sewage, less heat is input back into the environment, thereby further reducing the risk of thawing the permafrost.

Another advantage of the present invention is the above-ground configuration provides accessability, and in the event of a malfunction, the surface discharge provides an instantaneous, malodorous notification.

Another feature of this invention is that by incorporating the entire system, including the pretreatment compartment, the aerobic treatment compartment and the discharge compartment into a single tank, in the event of ground movement due to thawing of permafrost, or even earthquake, differential movement of the system components is prevented.

Other features and advantages of the present invention will become apparent from the following description of the preferred embodiments, taken in conjunction with the accompanying drawings, which illustrate, by way of example, the principles of the invention.

DESCRIPTION OF THE DRAWINGS

The details and features of the present invention may be more fully understood by referencing the detailed description and drawings, in which.

DETAILED DESCRIPTION OF THE INVENTION

Figure 1:
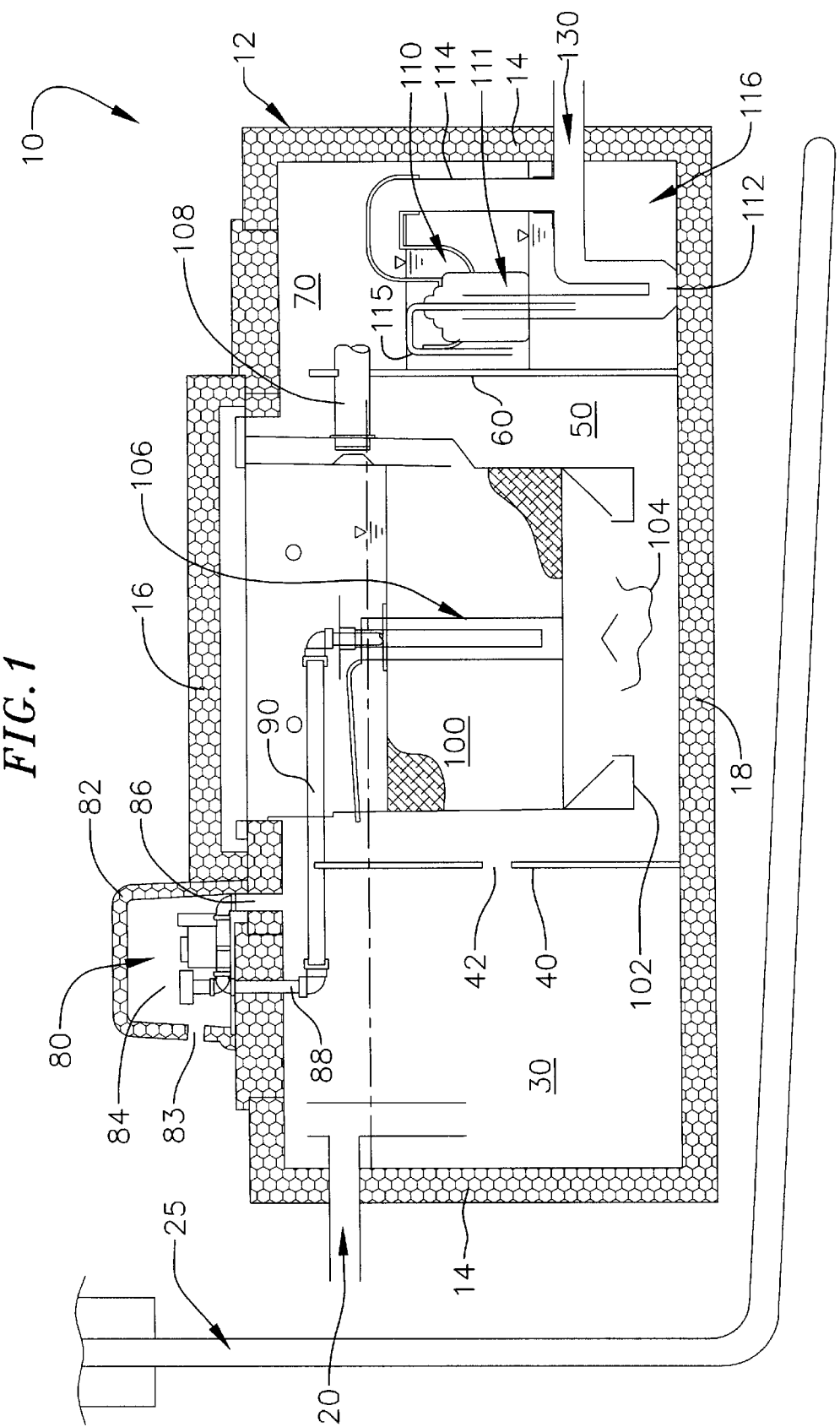
FIG. 1 is a cross-sectional view of one embodiment of the present invention, including the pretreatment compartment, the treatment compartment, and the dosing siphon compartment.

FIG. 1 illustrates the sewage treatment process. The sewage first enters a pretreatment stage for separation of floating and settling solids, greases and oils. It will be appreciated by those skilled in the art that as used herein, the term "sewage" includes: domestic wastewater, non-domestic wastewater, and graywater, and may include waterborne human wastes; used water from a water-using fixture or appliance such as a toilet, bath, laundry, lavatory, kitchen or other sink; and used water from a commercial, industrial, chemical or other process. Sewage is commonly derived from dwellings, commercial buildings, institutions, industrial facilities, or similar structures or facilities. The sewage then moves to the aerobic treatment stage, where the combination of oxygen and fixed activated sludge, or other biological, physical or chemical treatment process, act to treat the sewage. The treated sewage then enters the discharge stage, where the treated sewage is temporarily contained, and upon reaching a predetermined level, is discharged in a batch or slug, at a relatively high flow rate. It will be appreciated by those skilled in the art that in the preferred embodiment, each "stage" described above occurs in a separate compartment. However, it will be further appreciated that in other embodiments, there may be fewer or more compartments than stages.

In the preferred embodiment, the sewage treatment system 10 is housed within a tank 12. In the preferred embodiment, the tank is a rectangular tank, but it will be appreciated by those skilled in the art that in other embodiments, other shapes and styles of tank could also be used, such as a cylindrical tank. It will be further appreciated that the system could also be housed in a plurality of tanks or modules, including separate tanks housing each stage. Regardless of the tank shape, the tank walls 14 include at least one layer of insulation. In the preferred embodiment, this is a urethane foam insulation, but it will be appreciated by those skilled in the art that the insulation could also be fiberglass, polystyrene, or any other type of durable insulation known in the art. The top 16 and bottom 18 walls of the tank are similarly insulated. Additional insulation may be added as needed, especially on the bottom of the tank to prevent thawing of the permafrost below. In the preferred embodiment, rigid blue foam insulation, commonly known as "blue board" is installed beneath the tank. Preferably, air spaces between the sections of blue board allow for dissipation of heat. In addition, in areas with greater seasonal temperature variances, a thermosiphon 25, such as the type available from Arctic Foundations, Inc., Anchorage, Alaska, may be installed to aid in keeping the permafrost frozen. It will be appreciated by those skilled in the art that in other embodiments other thermosiphons may be used, as well as any other method of keeping the permafrost frozen that is known in the art. In another embodiment, the tank is elevated above ground, with an air space between the bottom of the tank and the ground surface to prevent thawing of the permafrost. In yet another embodiment, the tank may be suspended from a piling. In areas where the ground temperature remains low throughout the year, such as the North Slope of Alaska, e.g., Prudhoe Bay, the permafrost will likely remain frozen without the need for a thermosiphon.

Preferably, the tank 12 is subdivided into three main compartments: the pretreatment compartment 30, the aerobic treatment compartment 50, and the discharge compartment 70. Preferably, while the compartments are separated by dividers, the dividers do not extend to the tops of the respective compartments, the tank thereby retaining an upper air space common to all three compartments. However, it will be appreciated by those skilled in the art that in another embodiment, the dividers extend from the bottom to the top of the respective compartments, with each respective compartment thereby defining its own individual upper air space.

Sewage enters into the pretreatment compartment 30, flows into and is treated in the aerobic treatment compartment 50, then flows into the discharge compartment 70, from where it is discharged to the environment. It will be appreciated by those skilled in the art that in another embodiment, each compartment is housed within a separate tank or module. In another embodiment, the pretreatment stage is divided into a plurality of compartments or modules. It will be further appreciated by those skilled in the art that any or all of the stages or compartments could be subdivided into a plurality of compartments or modules.

Sewage enters into the sewage treatment system 10 through inlet 20, which empties into the pretreatment compartment 30. Here, separation of the sewage occurs, as floating and settling of solids, greases and oils takes place. A divider 40 separates the pretreatment compartment 30 from the aerobic treatment compartment 50. An opening 42 in the divider 40 allows the sewage to flow from the pretreatment compartment 30 into the aerobic treatment compartment 50. The divider may be constructed of any semi-rigid material which is compatible with the sewage. In one embodiment, the divider is a flat sheet of fiberglass coated wood, with a centrally located hole to allow passage of sewage; however, the divider could also be constructed of other materials, such as PVC plastic, and could have other configurations such as multiple sewage passage holes, or gas deflection baffles.

In the preferred embodiment, a modular aerobic sewage treatment unit 100 provides aerobic treatment of the sewage. A blower 80 provides the necessary oxygen for the aerobic treatment of the sewage.

The blower 80 is located adjacent the tank 12; however, it will be appreciated by those skilled in the art that the blower may also be built into the tank, or could be separated from the tank. Preferably, the blower 80 is mounted on top of the tank, and is enclosed in an insulated housing 82. The insulated housing 82 acts to hold in the heat generated by the blower and direct it toward the tank. Preferably, the blower 80 is electrically powered. The blower 80 has two air intakes: a fresh air intake 84, which draws in air from outside the system, and a recirculating air intake 86, which draws in and recirculates air from within the system. In the preferred embodiment, the fresh air intake 84 is located within the insulated housing 82 so that the heat generated by the blower may be utilized to heat the intake air. In the preferred embodiment, the recirculating air intake 86 is located in the pretreatment compartment 30 to take advantage of the latent heat of the incoming sewage. However, it will be appreciated by those skilled in the art that such heat would also be present in the aerobic treatment compartment 50, and in the dosing compartment 70, and that in other embodiments, the recirculating air intake 86 is located in the aerobic treatment compartment or in the dosing compartment. In yet another embodiment, a recirculating air intake is located in each of the pretreatment compartment 30, the aerobic treatment compartment 50, and the dosing compartment 70. The blower draws in the air from the fresh air intake and the one or more recirculating air intakes, and blows this air out an outlet 88. The outlet 88 is pneumatically coupled to the aerobic sewage treatment unit 100 by a run of piping 90. Preferably, the piping 90 runs from the blower 80 down into the pretreatment compartment 30, and then into the aerobic treatment compartment 50, where it is coupled to the aerobic sewage treatment unit 100. It will be appreciated by those skilled in the art that in other embodiments, the routing of the piping will vary, and that tubing, hosing, ductwork, or other methods of routing the air may also be used.

The blower 80 provides air to the aerobic sewage treatment unit 100, thereby providing the oxygen necessary to sustain the aerobic treatment of the sewage. It will be appreciated by those skilled in the art that while in the preferred embodiment, the aerobic treatment of the sewage is accomplished by a modular aerobic sewage treatment unit 100, the means for treating the sewage could also be integrated directly into the aerobic treatment compartment. By combining already warm air from the pretreatment and/or aerobic treatment compartments with the cold fresh air, the fresh air is significantly warmed. In the preferred embodiment, a ratio of 90% recirculated air to 10% fresh air is used. However, it will be appreciated by those skilled in the art that this ratio may be changed depending on the air temperature, and on the oxygen requirements of the aerobic sewage treatment unit, and thus in other embodiments, other ratios of fresh air to recirculated air will be used. For example, where temperatures are generally above freezing, a ratio of 50% recirculated air to 50% fresh air may be used. However, as the ambient temperature drops, the preferred percent of recirculated air increases, such that the mixture is preferably 50% to 98% recirculated air, and 50% to 2% fresh air. It will be further appreciated by those skilled in the art that the minimum design percentage for fresh air is dictated by the oxygen requirements of the aerobic treatment unit, while the minimum design percentage for recirculated air is dictated by the temperature requirements of the aerobic treatment unit, in conjunction with the amount of heat recovered from the sewage and the blower, and any ratio of fresh air to recirculated air in which the preceding design criteria are all satisfied may be used. Thus in another embodiment in a less extreme environment, or when more latent heat may be recovered from the sewage, or when more heat is recovered from the blower, less than 50% recirculated air is be used.

A secondary benefit of using a ratio of 10% fresh air to 90% recirculated air is that the flow through the outside air intake 84 is reduced, allowing the air to remain in the insulated blower housing 82 for a greater period of time before being drawn into the blower and finally mixed with the recirculated air and delivered to the aerobic sewage treatment unit. Preferably, a single opening 83 in the insulated housing 82 allows outside air to enter the housing. The fresh air intake 84 draws in fresh air, which has previously entered the housing 82 through the opening 83 and has been warmed by the heat generated by the blower. As the air from within the housing is drawn into the fresh air intake 84, additional fresh air is drawn into the housing through the opening 83. It will be appreciated by those skilled in the art that as the percentage of fresh air drawn in by the blower is reduced, and the percentage of recirculated air drawn in is increased, the flow rate through the opening 83 into the insulated housing 82 decreases proportionately with the percentage of fresh air, thereby allowing the air in the housing to warm up further before being drawn into the blower 80.

The aerobic sewage treatment unit 100 is preferably a commercially available sewage treatment module. In the preferred embodiment, the sewage treatment unit 100 is a MicroFAST (fixed activated sludge treatment) ATU (aerobic treatment unit) manufactured by BioMicrobics, Shawnee, Kansas. However, it will be appreciated by those skilled in the art that depending on the projected sewage load, and the desired size of the tank, other FAST models may be used. It will be further appreciated by those skilled in the art that other aerobic treatment units may also be used, including other fixed activated sludge systems, suspended activated sludge systems, combinations thereof, or other physical, chemical and/or biological aerobic treatment units, and that such units may be modular units which are simply placed into the aerobic treatment compartment 50, or the aerobic treatment unit may be integrated directly into the aerobic treatment compartment itself. While in the preferred embodiment the ratio of fresh air to recirculated air is optimized for use with the fixed activated sludge treatment system, it will be appreciated by those skilled in the art that the mixing of fresh air and recirculated air to maintain a minimum air temperature is applicable to any biological, physical and/or chemical method of treating sewage which requires oxygen, and that the depending on the type of aerobic system used, the preferred design temperature and the preferred ratio of fresh air to recirculated air will vary.

In order to function properly, the aerobic sewage treatment unit 100 requires a supply of oxygen, which is proportional to the amount of sewage to be treated. For proper operation of the sewage treatment unit, the temperature in the sewage treatment compartment should be kept above approximately 10° C. (50° F.) for removal of the $BOD_5$, and above 20° C. (68° F.) for removal of nitrogen. $BOD_5$, the Five Day Biochemical Oxygen Demand, is a measure of the concentration of organic impurities in waste water, and specifies the amount of oxygen required by bacteria while decomposing organic matter under aerobic conditions. In the preferred embodiment, removal of nitrogen was not a critical concern, and thus the minimum design temperature for the sewage treatment compartment was 16° C. (60° F.). However, it will be appreciated by those skilled in the art that in applications where nitrogen removal is a design concern, the minimum design temperature for the sewage treatment compartment would be 20° C. (68° F.)

The sewage entering into the sewage treatment system through inlet 20 brings with it latent heat. Although the actual temperature of the incoming sewage varies greatly, from extremely hot, e.g., when a dishwasher is being run, to approximately room temperature, e.g. when a toilet is flushed, to cold, e.g. during the regeneration cycle of a water softener, it is still generally well above the temperature of the external environment.

By providing a mixture of cold fresh air with warmer recirculating air from the pretreatment and/or sewage treatment compartments, and by capturing the heat generated by the blower, the air provided to the sewage treatment unit may be maintained at a temperature above 16° C. (60° F.), allowing proper operation of the sewage treatment unit. The design temperature of at least 16° C. (60° F.) is maintained even in the most extreme conditions, as shown in the following example.

EXAMPLE

During the period from Jan. 10, 2000 to Feb. 12, 2000, data were recorded for two sewage treatment systems, in accordance with one embodiment of the present invention, operating in Fairbanks, Alaska. System 1 was installed on a hauled water system, for a family of two using approximately 75 gallons of water per day. System 2 was installed on a well water system, for a family of four using approximately 650 gallons of water per day. These two very different systems demonstrate the suitability of the present invention to a wide range of applications.

While the temperature of the incoming sewage in the two systems was not recorded due to the extreme variations in incoming sewage temperature discussed above, the temperature at the bottom of the pretreatment compartment for each system was recorded every 30 minutes. In addition, the outside air temperature, the temperature at the recirculating blower inlet, and the temperature at the blower outlet were also recorded. Finally, the respective temperatures within the aerobic treatment compartment and the dosing compartment were also recorded during field measurements.

While the temperature of the incoming sewage is presumed to have varied greatly as is typical, the average temperature at the bottom of the pretreatment compartment averaged 18.7° C. in System 1, and 20.7° C. in System 2, as shown in Table I. Single measurements taken during monthly sampling events showed that the surface temperature inside the pretreatment compartment was 5° C. to 10° C. warmer than the temperature measured at the bottom of the tank.

By providing a mixture of cold fresh air with warmer recirculating air from the sewage treatment system, and by capturing the heat generated by the blower, the average temperature of the sewage in the aerobic treatment compartment in the two systems was 19.0° C. and 21.3° C. respectively, well above the design temperature of 16' C. In addition, System 1 had an average blower inlet temperature of 34.9° C., measured on the inlet piping to the blower, and an average blower outlet temperature of 51.1° C., measured on the outlet piping of the blower, for an average temperature rise of 16.2°C. across the blower. System 2 had an average blower inlet temperature of 26.5°C. and an average blower outlet temperature of 36.0°C., for an average temperature rise of 9.5° C. across the blower. The difference in the temperature rises may be attributed in part to variations in the piping configurations 90 of the two systems.

During the time that data were being collected, the temperature in Fairbanks dropped as low as −39° C., and averaged approximately −13° C., as shown in Table I. Even during this extreme cold, the temperature in the aerobic treatment compartment of both systems averaged approximately 20° C., well above the design temperature of 16° C., and both systems continued to function properly. The systems have proven reliable at even more extreme temperatures, as prior to the collection of data for the two systems, the temperature in Fairbanks dropped as low as −51° C. (−60° F.). Even under such extreme Arctic conditions, both systems continued to function properly.

TABLE I

Average Temperatures (1/10/2000 to 2/12/2000)

| | Outside Air | Blower Inlet | Blower Outlet | Pretreatment Compartment | Aerobic Treatment Compartment | Dosing Compartment | Blower ΔT |
|---|---|---|---|---|---|---|---|
| System 1 | −13.4° C. | 34.9° C. | 51.1° C. | 18.7° C. | 19.0° C. | 18.2° C. | 16.2° C. |
| System 2 | −13.9° C. | 26.5° C. | 36.0° C. | 20.7° C. | 21.3° C. | 19.0° C. | 9.5° C. |

It is clear from the previous example that the system will function properly without the addition of an auxiliary heat source. However, it will be appreciated by those skilled in the art that in other embodiments, auxiliary heating systems may be utilized. For example, in applications where the incoming flow of sewage is very low, and provides insufficient latent heat to maintain the design temperature, an auxiliary heat source such as heat tape, a thermal blanket, a pad heater, a circulating hot water heater, or other heat source may be used to maintain the design temperature within the system. In another embodiment, such auxiliary heat source is provided, but is only activated when the inflow drops below a predetermined level, such as when the occupants of the sewage producing unit are on vacation, or any other reason that sewage production may be temporarily suspended. In another embodiment, the auxiliary heating system is a pump which circulates heated propylene glycol through a circuit of piping, which runs through the pretreatment compartment, the aerobic treatment compartment, and the dosing compartment. In one embodiment, this circulating pump is manually activated, while in another embodiment, the pump is thermostatically activated depending on the temperature within the system.

After entering the system through the inlet 20, the sewage falls into the pretreatment compartment 30. The purpose of the pretreatment compartment 30 is to retain floating and settling solids, greases and oils. After the sewage rises to a predetermined level, the sewage flows through opening 42 in the divider 40 and into the aerobic treatment compartment 50. There, the sewage level rises until the sewage reaches the bottom 102 of the aerobic sewage treatment unit 100. There the sewage enters into the aerobic treatment unit 100 through openings 104 in the bottom 102 of the unit. The air from the blower is distributed into the aerobic sewage treatment unit 100 through an air lift pump 106, which lifts the sewage while imparting oxygen to it, allowing the sewage to then react and be treated by the fixed activated sludge. The air lift pump is simply a tube which fills with sewage, where the blower outlet provides air to the bottom of the tube and air bubbles rise up pulling the sewage with them. The treated sewage continues to rise until it reaches the outlet 108 of the aerobic sewage treatment unit 100. The outlet 108 is sealed to both the aerobic sewage treatment unit 100 and the divider 60 which divides the sewage treatment compartment 50 from the discharge compartment 70. This sealed outlet 108 is the only way for sewage to enter into the discharge compartment 70, and the only way for sewage to enter the outlet 108 is through the aerobic sewage treatment unit 100, and thus only treated sewage is allowed to enter the discharge compartment. It will be appreciated by those skilled in the art that as discussed previously, in other embodiments, other types of aerobic treatment units may be used. However, regardless of the type of aerobic treatment unit utilized, only sewage which has been treated is allowed to enter into the discharge compartment 70.

In the preferred embodiment, the discharge compartment is equipped with a dosing siphon 110. The dosing siphon includes a chamber 111, a trap leg 112 running from the chamber 111 to a discharge outlet 130, an overflow leg 114 running to the discharge outlet 130, and a vent pipe 115. During normal operation, treated sewage collects in the discharge compartment 70, and rises into the bottom of the siphon chamber 111. When the treated sewage reaches the level of the vent pipe 115, an air seal is effected. The treated sewage level in the discharge compartment 70 continues to rise, with the sewage level within the chamber 111 rising much more slowly. As the level of the treated sewage rises, increasing air pressure begins forcing water out of the trap 112. When the treated sewage level within the chamber approaches the top of the trap leg 112, air is released around the trap, relieving the back pressure within the siphon, and the treated sewage is drawn up from the chamber, around, and down into the trap leg, starting the siphon action. The treated sewage then flows through the trap leg 112 to the outlet 130. The dosing siphon allows the treated sewage to collect to a predetermined level, then discharges the treated sewage (effluent) in "slugs" or "batches" at a high flow rate through discharge outlet 130 and into an effluent pipe (not shown). In case of an overflow of treated sewage at the siphon, or within the discharge compartment, the treated sewage flows through the overflow leg 114 to the discharge outlet 130. The length of the effluent pipe will vary with the particular application and the placement of the system. In the preferred embodiment, the slug or batch volume is approximately 60 gallons, and is discharged over approximately one minute, for an approximate flow rate of 60 gallons per minute (gpm). Preferably, a splash plate is located at the end of the effluent pipe, in the flow stream of the treated sewage, to diffuse the flow of the effluent and to prevent erosion due to the high flow-rate discharge. This high flow rate discharge prevents the ice build-up and glaciering that is common in low flow rate discharge systems in cold regions. However, it will be appreciated by those skilled in the art that in embodiments designed for less extreme environments, or where ice build-up or glaciering is less of a concern, the treated sewage may simply gravity drain from the discharge compartment, without the need for a dosing siphon. In another embodiment, a pump located in the discharge compartment pumps the treated sewage out, either continuously, intermittently, or when the treated sewage reaches a predetermined level in the discharge compartment. In yet another embodiment, the entire discharge compartment is eliminated, and the treated sewage exits the system through the outlet 108 in the aerobic treatment compartment 50.

Because the dosing siphon generates large forces during discharge, it is secured in place within the discharge compartment. Preferably, the dosing siphon is poured in an anchoring material 116, such as concrete, which provides a secure anchor for the siphon as well as a heat sink for any remaining latent heat in the treated sewage. In another embodiment, the siphon is secured in place by sprayed urethane foam insulation.

In the preferred embodiment, where discharge is to the surface of the ground, and where a dosing siphon 110 is used to regulate the effluent flow from the discharge compartment 70, a trap is located along the discharge line 130 to prevent the convective air flow of cold air back into the system. It will be appreciated by those skilled in the art that in another embodiment, the trap is located along the overflow leg 114 of the siphon 110. It will be further appreciated by those skilled in the art that a p-trap, s-trap, flapper valve, check valve or any other system or device which prevents back flow of cold air into the system may be used, and that such device may be placed along the overflow leg 114 of the siphon 110, and/or along the discharge outlet 130 such that convective air flow of cold air back into the sewage treatment system 10 is prevented. It will be further appreciated by those skilled in the art that regardless of whether the embodiment uses a siphon, pump, gravity drain or other method of discharge, in extreme environments where a surface discharge is desired, a trap or valve will be necessary along the discharge line to prevent convective air flow of cold air back into the system.

In the preferred embodiment, disinfecting equipment (not shown) is placed in the discharge compartment 70 to disinfect the treated sewage before it is discharged to the environment.

Although the invention has been described in detail with reference only to the preferred embodiments, those having ordinary skill in the art will appreciate that various modifications can be made without departing from the spirit and scope of the invention. Accordingly, the invention is defined with reference to the following claims.

What is claimed is:

1. A sewage treatment system, comprising:
   a pretreatment compartment, having an inlet and an outlet,
   an aerobic treatment compartment, including an aerobic sewage treatment unit, the aerobic treatment compartment having an inlet and an outlet, such that the inlet of the aerobic treatment compartment is coupled to the outlet of the pretreatment compartment to permit flow of sewage between the two, a blower, having a first air inlet and a second air inlet, both coupled to an air outlet, such that the first air inlet draws in air from outside the sewage treatment system, and the second air inlet draws in and recirculates air from inside the sewage treatment system, wherein the air outlet is coupled to the aerobic sewage treatment unit to permit air flow through the aerobic sewage treatment unit, and wherein the blower is insulated to retain heat within the sewage treatment system.

2. A sewage treatment system comprising:

a pretreatment compartment, having an inlet and an outlet, an aerobic treatment compartment, including an aerobic sewage treatment unit, the aerobic treatment compartment having an inlet and an outlet, such that the inlet of the aerobic treatment compartment is coupled to the outlet of the pretreatment compartment to permit flow of sewage between the two, a blower, having a first air inlet, a second air inlet, and a third air inlet, all coupled to an air outlet, such that the first air inlet draws in air from outside the sewage treatment system, the second air inlet draws in and recirculates air from inside the sewage treatment system, and the third air inlet draws in and recirculates air from inside the aerobic sewage treatment unit.

3. A sewage treatment system as in claim 1, further comprising a discharge compartment, having an inlet and an outlet, such that the inlet of the discharge compartment is coupled to the outlet of the aerobic treatment compartment.

4. A sewage treatment system as in claim 3, further comprising a dosing siphon within the discharge compartment, the dosing siphon coupled to the outlet of the discharge compartment.

5. A sewage treatment system as in claim 3, further comprising a pump within the discharge compartment, the pump coupled to the outlet of the discharge compartment.

6. A sewage treatment system as in claim 3, wherein the aerobic sewage treatment unit is coupled to the outlet of the aerobic treatment compartment.

7. A sewage treatment system as in claim 3, wherein the aerobic sewage treatment unit is a modular unit.

8. A sewage treatment system as in claim 7, wherein the aerobic sewage treatment unit is a fixed activated sludge treatment unit.

9. A sewage treatment system as in claim 3, further comprising a tank, having top, bottom and side walls, the tank defining the pretreatment compartment, the aerobic treatment compartment and the discharge compartment.

10. A sewage treatment system as in claim 9, further comprising a disinfecting system within the tank.

11. A sewage treatment system as in claim 9, where the top, bottom and side walls of the tank are insulated.

12. A sewage treatment system as in claim 11, wherein the pretreatment compartment, the aerobic treatment compartment and the discharge compartment are defined by dividers within the tank.

13. A sewage treatment system as in claim 12, wherein the blower is located adjacent the tank, and further comprising an insulated housing around the blower.

14. A sewage treatment system as in claim 13, where the blower is pneumatically coupled to the aerobic sewage treatment unit by piping which runs from the blower, through the tank, into the aerobic treatment compartment, and to the aerobic sewage treatment unit.

15. A sewage treatment system comprising:

a pretreatment compartment, having an inlet and an outlet, an aerobic treatment compartment, including an aerobic sewage treatment unit, the aerobic treatment compartment having an inlet and an outlet, such that the inlet of the aerobic treatment compartment is coupled to the outlet of the pretreatment compartment to permit flow of sewage between the two, a blower, having a first air inlet and a second air inlet, both coupled to an air outlet, such that the first air inlet draws in air from outside the sewage treatment system, and the second air inlet draws in and recirculates air from inside the sewage treatment system, wherein the air outlet is coupled to the aerobic sewage treatment unit to permit air flow through the aerobic sewage treatment unit, a discharge compartment, having an inlet and an outlet, such that the inlet of the discharge compartment is coupled to the outlet of the aerobic treatment compartment, and a trap coupled to the outlet of the discharge compartment, such that convective air flow into the discharge compartment outlet is prevented.

16. A sewage treatment system, comprising:

an insulated tank, having interior dividers dividing the tank into a pretreatment compartment, an aerobic treatment compartment, and a discharge compartment;

the pretreatment compartment having an inlet and an outlet;

the aerobic treatment compartment, having an inlet and an outlet, and containing an aerobic sewage treatment unit, such that the inlet of the aerobic treatment compartment is coupled to the outlet of the pretreatment compartment, and the aerobic sewage treatment unit is coupled to the outlet of the aerobic treatment compartment;

a blower, having a first air inlet and a second air inlet, both coupled to an air outlet, such that the first air inlet draws in air from outside the tank, and the second air inlet draws in air from inside the tank, wherein the air outlet is coupled to the aerobic sewage treatment unit by piping which passes through the pretreatment compartment and into the aerobic treatment compartment;

the discharge compartment having an inlet and an outlet, such that the inlet of the discharge compartment is coupled to the outlet of the aerobic treatment compartment;

a dosing siphon, located within the discharge compartment, and coupled to the outlet of the discharge compartment; and a trap coupled to the outlet of the discharge compartment, such that convective air flow into the discharge compartment outlet and the discharge compartment is prevented.

17. A sewage treatment system, comprising:

a tank, housing a pretreatment means, coupled to an aerobic sewage treatment means, coupled to a discharge means;

a blower means, coupled to the aerobic sewage treatment means, such that air from both inside and outside the tank is combined and provided to the aerobic sewage treatment means; and a trap means, coupled to the discharge means, such that air outside the tank is prevented from flowing into the discharge means.

18. A method of treating sewage, comprising:

collecting sewage in a pretreatment compartment;

allowing grease and oils to float toward the top of the sewage;

allowing solids to settle toward the bottom of the sewage;

using a blower to recirculate air from the pretreatment compartment to an aerobic sewage treatment unit;

using the blower to direct air from outside the aerobic sewage treatment unit to the aerobic sewage treatment unit;

capturing a portion of the heat generated by the blower and directing it toward the aerobic sewage treatment unit;

using the blower to recirculate air from the aerobic sewage treatment unit back into the aerobic sewage treatment unit;

transporting the sewage to the aerobic sewage treatment unit; and aerobically treating the sewage.

19. A method of treating sewage, comprising:

collecting the sewage in an enclosed system;

allowing grease, oil and solids to settle and/or float out of the sewage;

using a blower to continuously recirculate air from within the enclosed system, and draw in air from outside the enclosed system, and directing this air to an aerobic sewage treatment unit;

capturing a portion of the heat generated by the blower to warm the air;

transporting the sewage from the pretreatment compartment to the aerobic sewage treatment unit;

aerobically treating the sewage;

transporting the treated sewage to a discharge compartment;

discharging the treated sewage in batches; and preventing back flow of air from outside the enclosed system into the discharge compartment.

20. A method of treating sewage as in claim 19, further comprising the step of disinfecting the sewage prior to discharge.

* * * * *